(No Model.) 4 Sheets—Sheet 2.
I. T. DYER & R. O'S. BURKE.
LIQUID RAISING APPARATUS.
No. 547,634. Patented Oct. 8, 1895.
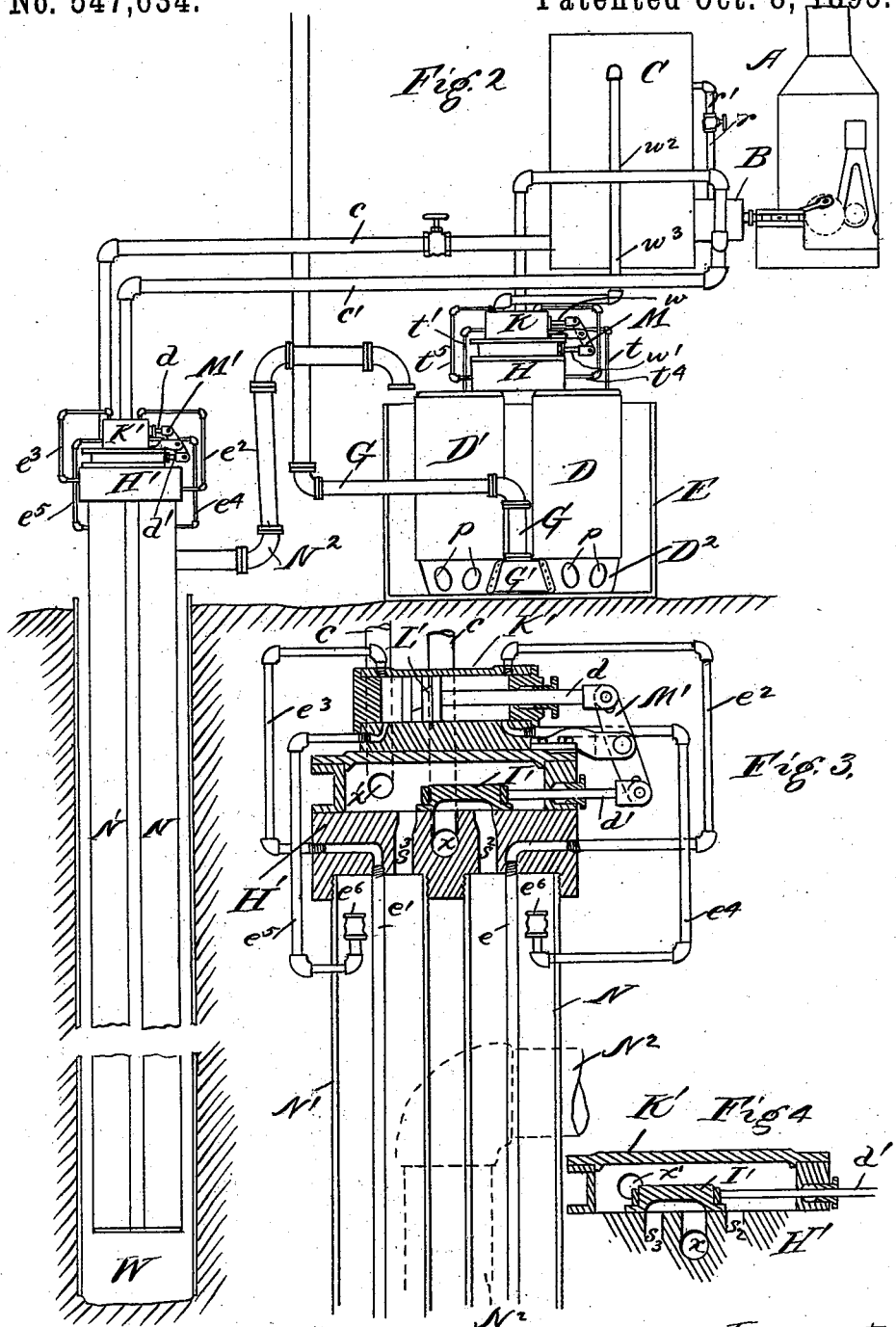
Witnesses:
H. J. Frost
W. U. Williams
Inventors:
Isaac T. Dyer
Ricard O'S. Burke
By Dyrenforth & Dyrenforth,
Att'ys.

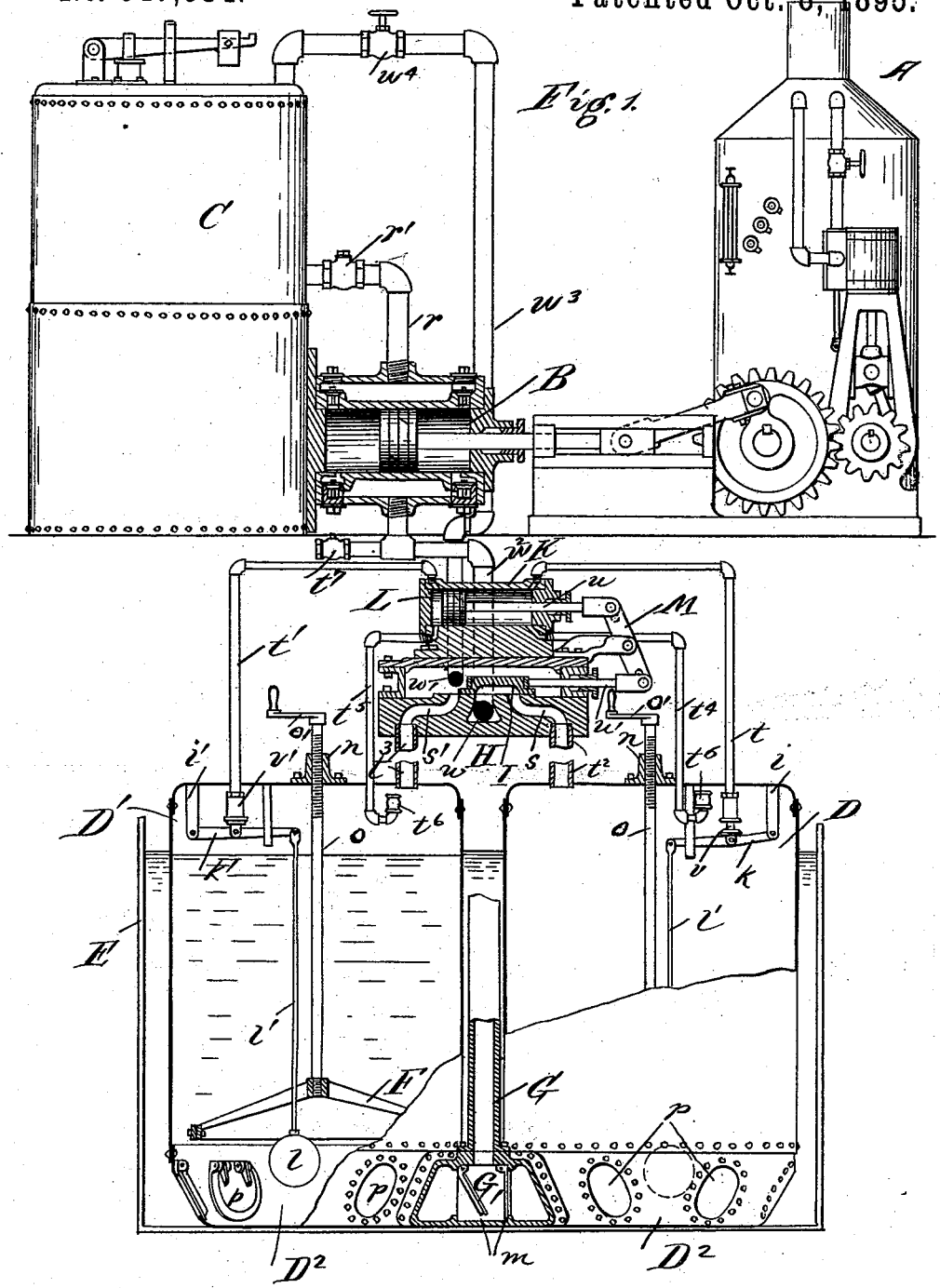

(No Model.) 4 Sheets—Sheet 3.
I. T. DYER & R. O'S. BURKE.
LIQUID RAISING APPARATUS.
No. 547,634. Patented Oct. 8, 1895.
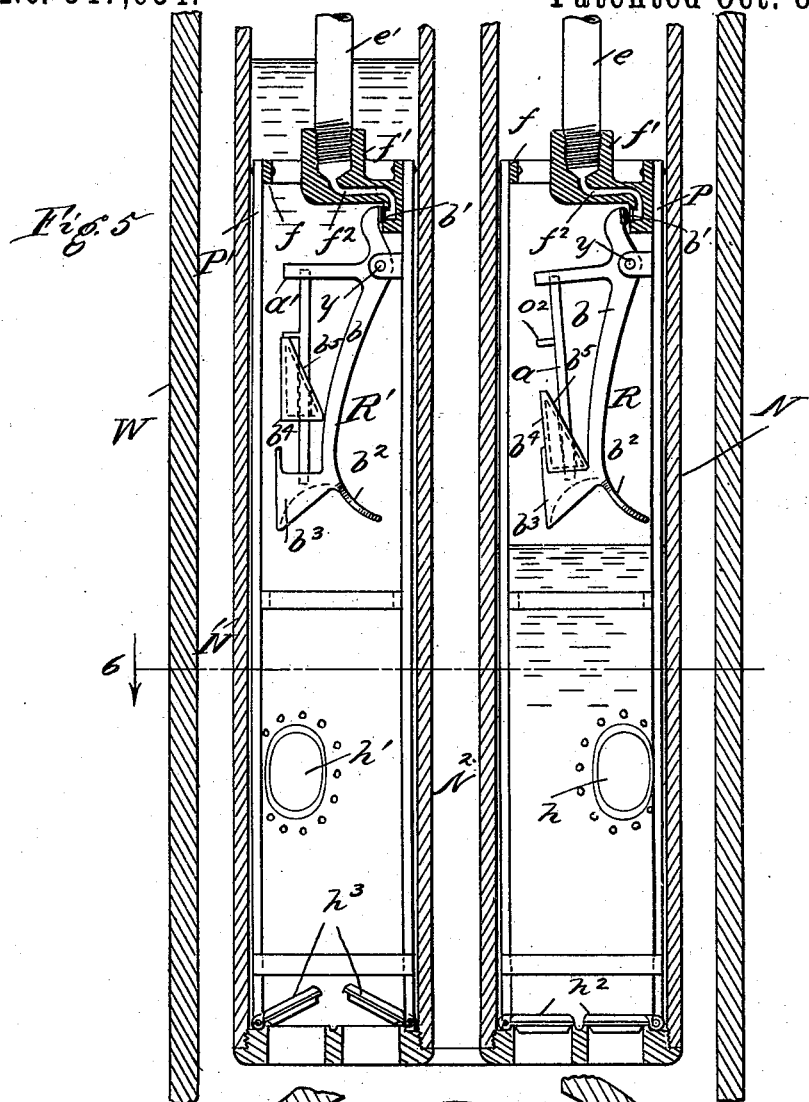
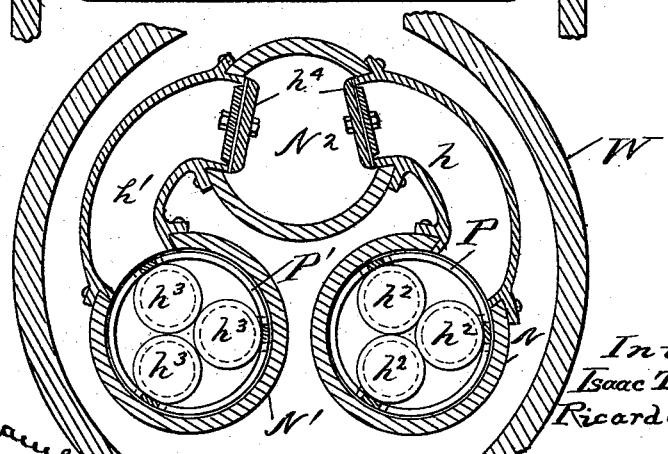
Witnesses:
M. J. Frost.
W. U. Williams.
Inventors:
Isaac T. Dyer
Ricard O'S. Burke
By Dyrenforth and Dyrenforth, Att'ys.

(No Model.) 4 Sheets—Sheet 4.
I. T. DYER & R. O'S. BURKE.
LIQUID RAISING APPARATUS.
No. 547,634. Patented Oct. 8, 1895.
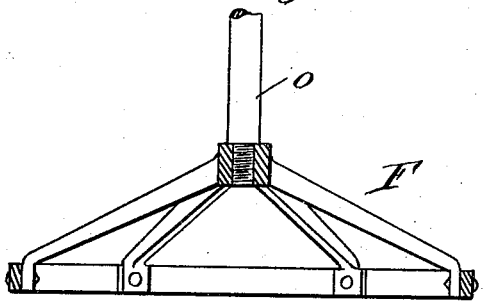
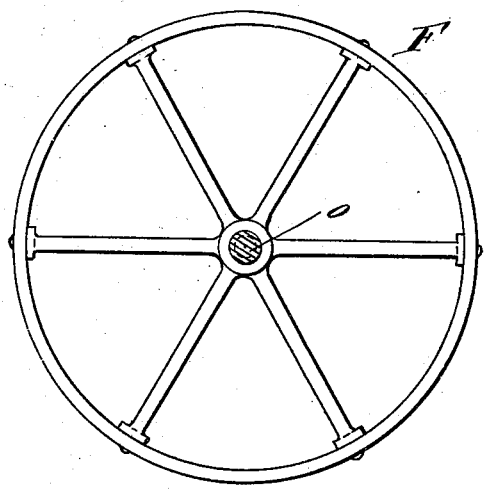
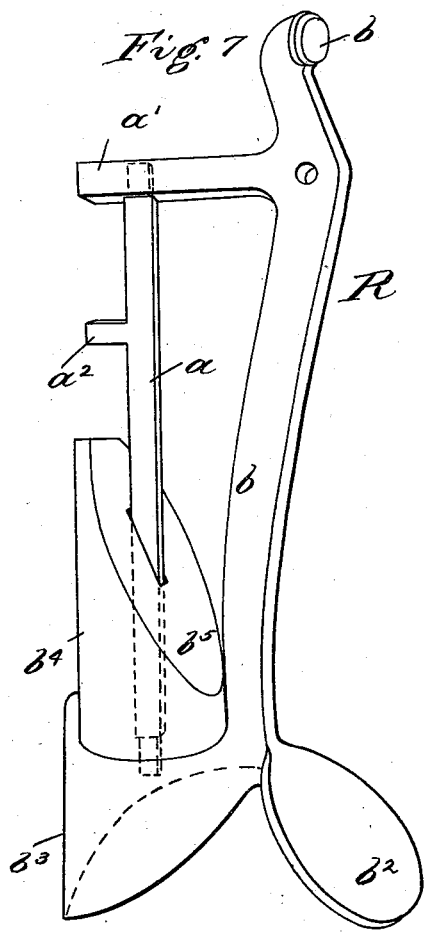
Witnesses:
M. J. Frost.
W. U. Williams.
Inventors:
Isaac T. Dyer.
Ricard O'S. Burke
By Dyrenforth and Dyrenforth,
Att'ys.

UNITED STATES PATENT OFFICE.

ISAAC T. DYER AND RICARD O'SULLIVAN BURKE, OF CHICAGO, ILLINOIS.

LIQUID-RAISING APPARATUS.

SPECIFICATION forming part of Letters Patent No. 547,634, dated October 8, 1895.

Application filed August 14, 1894. Serial No. 520,266. (No model.)

*To all whom it may concern:*

Be it known that we, ISAAC T. DYER and RICARD O'SULLIVAN BURKE, citizens of the United States, residing at Chicago, in the county of Cook and State of Illinois, have invented a new and useful Improvement in Liquid-Raising Apparatus, of which the following is a specification.

Our invention relates to an improvement in the class of apparatus for elevating a liquid which has been introduced or caused to accumulate in a suitable reservoir, as a tank or well, by forcing downward upon the surface of the confined liquid air under pressure sufficient to drive the liquid out of the reservoir into a discharge-conduit leading upward to the point to which it is desired to effect the elevation.

More particularly stated, our invention relates to an improvement in the class of apparatus referred to, wherein the action of air-pressure produced by suitable air-compression and storage mechanism is alternately exerted upon the liquid contents of the members of a pair of reservoirs through the medium of a valve device automatically actuated by the air-pressure introduced into the reservoirs.

One of the objects of our invention is materially to improve the action and simplify the mechanism of the valve device referred to.

Our further object is to provide for extending the apparatus to cause it to perform the additional function of recovering the water from a well, as an Artesian or an oil well and the like, the natural pressure of which has subsided.

Referring to the accompanying drawings, Figure 1 is a view in elevation, mainly sectional and partly broken, of our improved liquid-raising apparatus in its simple form. Fig. 2 shows the same in elevation on a reduced scale and co-operatively connected with an apparatus operative on the same principle for raising liquid from a well in which it rises naturally but to a low level. Fig. 3 is a view in broken elevation, enlarged over the scale observed in Fig. 2, and showing the valve mechanism in section with the valve in one of its two positions. Fig. 4 shows the valve in section in the other of its two positions. Fig. 5 is a broken sectional view indicating a well and showing in detail the mechanism we introduce into the well for forcing out of it the liquid which rises therein only to a comparatively-low level. Fig. 6 is a broken section taken at the line 6 on Fig. 5 and viewed in the direction of the arrow. Fig. 7 is a perspective view of a float-valve detail. Fig. 8 is a broken view in sectional elevation of a valve-closing ring detail employed with the apparatus illustrated in Fig. 1, and Fig. 9 is a plan section of the same.

Throughout the description hereinafter contained reference is had, for the sake of convenience, only to water as the liquid to be raised by our improved apparatus. It will be understood, however, that we design our improvement as well for similarly raising any kind of liquid.

A denotes an engine, which may be of any construction and variety suitable for working an air-pump B, the latter being adapted to compress air through a pipe $r$, containing a valve $r'$, (which should be a check-valve opening outward with relation to the pump,) into a compressed-air holder C.

D and D' are reservoirs represented as being immersed in a body of water, which is shown to be contained in a tank E, though it need not be. Each of the reservoirs, which are alike and both closed at the top, has a downwardly-tapering base $D^2$, containing a circumferential series of inwardly-opening flap-valves $p$, adapted to be closed against the water-pressure from without by air-pressure within the reservoir, and for closing which, as for cleaning the reservoir when it is devoid of internal air-pressure, we provide a ring or head F or spider fitting inside the base $D^2$ against the valves therein and adapted to be raised and lowered by suspension on a threaded stem $o$, working in a nut $n$ at the top of the reservior, beyond which it is provided with a handle $o'$ for turning it. The two reservoirs communicate at their bases through openings covered by outwardly-opening check or flap valves $m$ with a chamber G', from which there extends upward to any desired point of elevation a discharge-pipe G. Within each of the reservoirs D and D' is suspended a float-ball $l$ on a rod $l'$. The rod $l'$ in the reservoir D is hung from one end of a lever $k$, fulcrumed at its opposite end to a bearing $i$ in the reservoir and connected between its ends controllably with a shut-off valve $v$ of any suitable construction for opening and closing communication with the reservoir of an air-outlet pipe $t$. The rod $l'$ in the reservoir $D'$ is hung from one end of a lever $k'$, fulcrumed at its opposite end to a bearing $i'$ and connected between its ends with a shut-off valve $v'$, like the valve $v$, for controlling communication of an air-outlet pipe $t'$ with the reservoir $D'$.

H is a valve device containing air-ducts $s$ and $s'$, each opening at one end into the valve-chamber and communicating from their opposite ends, respectively, through pipes $t^2$ and $t^3$ with the reservoirs $D$ and $D'$ at their upper ends, and within the valve-chamber is supported the valve I, of the ordinary slide-valve variety, adapted in one of its two positions to connect a port $w$ with the duct $s$, leaving the duct $s'$ open through the valve-chamber to a port $w'$, and in its other position covering the port $w$ and duct $s'$ to produce their communication, and leaving the duct $s$ open through the valve-chamber to the port $w'$. The port $w$ has a pipe connection $w^2$ with the suction side or inlet of the pump B, and a pipe $w^3$, which should contain a suitable shut-off valve $w^4$, affords a discharge-conduit from the holder C to the port $w'$. Surmounting the valve device H is a cylinder K, containing a piston L, having its rod $u$ connected with one end of a lever M, fulcrumed at its center to a bearing on the valve-shell and having its opposite end connected with the valve I by a rod $u'$, working, like the rod $u$, through a stuffing-box. The pipes $t$ and $t'$ open into the cylinder K at opposite ends of the stroke of its contained piston, and air-outlet pipes $t^4$ and $t^5$ lead from that cylinder near its opposite ends, respectively, into the reservoirs D and D' through their tops and should contain in the reservoirs check-valves (indicated at $t^6$) which open outward. The pipe $w^2$ should have an inwardly-opening check-valve (indicated at $t^7$) to admit air from the outside should the air in the reservoirs D and D' ever fall below the normal of one atmosphere by reason of the action of the pump to prevent any vacuum in the reservoirs.

The operation of the apparatus as thus far described is as follows: Supposing the engine A and pump B to be in operation, with the holder C filled with air at desired pressure and the reservoir D' supplied with water and all the parts of the apparatus occupying the relative positions in which they are illustrated in Fig. 1, air from the holder enters the reservoir D' through the pipes $w^3$ $t^3$ and forces the water out through the respective valve $m$ into the upright discharge-pipe G to a desired height therein, according to the pressure employed. As the level of the water in the reservoir falls sufficiently to remove its buoying effect from the float-ball $l$ therein, the weight of the latter opens the valve $v'$, permitting sufficient of the compressed air contained in the reservoir to enter the cylinder K through the pipe $t'$ to force the piston L to the end of its stroke opposite that at which it is illustrated in Fig. 1, the air ahead of the piston discharging through the pipe $t^4$ into the reservoir D to remove its obstruction of the piston. This stroke of the piston L, by its connection with the valve I, slides the latter into position to cover the port $w$ and duct $s'$, thereby causing the action of the pump B to suck the air-contents of the reservoir D' through duct $s'$ and pipe $w^2$ and force it into the holder C through the pipe $r$ without the air having lost greatly of its pressure under which it was introduced into the reservoir. The air-pressure in the reservoir D' of course had operated to close the inlet-valves $p$ therein, and these open with the withdrawal of the air-pressure to permit refilling of the reservoir. Meantime—that is, during the period of evacuation of the reservoir D'—the pressure from outside of water against the valves $p$ of reservoir D open them to admit water for filling that reservoir, and as soon as the reservoir D' has been emptied and the piston L thereby forced to the end of its stroke, which opens communication between the duct $s$ and pipe $w^3$, air-pressure from the holder C enters the reservoir D, discharging its contents into the pipe G till the level of the water becomes sufficiently low to drop the respective float-ball $l$ to open the valve $v$, when sufficient air-pressure enters the cylinder K through the pipe $t$ to force the piston L back to the position at which it is illustrated in Fig. 1, (and in reaching which it forces the air ahead of it, to prevent cushioning, through the pipe $t^5$ into the reservoir D',) at which the valve I again covers the port $w$ and duct $s$ to permit the pump B to withdraw the air-pressure from the reservoir D to refill and to admit air-pressure from the holder C through the pipe $w^3$ $t^3$ and duct $s'$ upon the water in the reservoir D', with the result hereinbefore described. Thus, as will be understood, the reservoirs D and D' are alternately filled with water and discharged of their contents up into the pipe G. A well W, which does not fill adequately or fails to exert sufficient pressure to discharge and raise water, or which may be defective in its structure, may be operated by our improved apparatus already described, with the addition of our supplemental apparatus, of which the following is a description:

N and N' are tubes or tubular reservoirs connected together and having discharge-ducts $h$ and $h'$ (see Fig. 6) leading from them near their lower ends into opposite sides of a stand-pipe $N^2$, (shown in Fig. 2 as discharging into the tank E,) the lower ends of the tubes being provided with inwardly-opening flap-valves $h^2$ and $h^3$, and outwardly-opening check-valves $h^4$ being provided at the junctions of the ducts $h$ and $h'$ with the pipe $N^2$. These tubes are sunk into the well W. Into the respective sunken tubes we introduce the tubes P and P', each of which is provided at its upper end with a bearing $f$ for a threaded nipple $f'$, containing a duct $f^2$, one nipple having screwed into it the lower end of a pipe $e$ and the other the corresponding end of a pipe $e'$. The tubes N and N' are surmounted by a valve device H', in all respects like the valve device H, already described, and comprising a valve-chamber, from which lead the ducts $s^2$ and $s^3$, and containing the slide-valve I', operative to connect duct $s^2$ with a port $x$ and leave open through the valve-chamber communication with the duct $s^3$ of a port $x'$ and to connect port $x^2$ and duct $s^3$ and leave open communication between the port $x'$ and duct $s^2$.

Above the valve device H' is a cylinder K', containing a piston L', having its stem $d$ connected with one end of a lever M', fulcrumed between its ends on a bearing, as shown, and having its opposite end connected by a rod $d'$ with the slide-valve I'.

The pipes $e$ and $e'$ have extensions $e^2$ and $e^3$, which lead into the cylinder K' near its opposite ends, and pipes $e^4$ and $e^5$ lead from opposite ends of the cylinder, respectively, into the tubes P and P', wherein they should be provided with outwardly-opening check-valves, (indicated at $e^6$,) and they serve a purpose like that of the pipes $t^4$ and $t^5$. A pipe $c$, corresponding in purpose with the pipe $w^3$, leads from the holder C to the port $x'$, and a pipe $c'$, corresponding in purpose with the pipe $w^2$, leads from the port $x$ back to the pump B.

Within the tubes N and N' we provide float-valves R and R', each of the same construction, which is peculiar, for controlling the escape of compressed air from the tubes to the pipes $e$ and $e'$ for actuating the piston L'. This valve comprises a lever $b$, fulcrumed at $y$ and terminating at one end in a head $b'$, preferably of rubber, adjacent to the mouth of the duct $f^2$, against which it bears normally to seal the duct. From its fulcrum downward the lever, which is T-shaped in cross-section, is curved and terminates at its lower end in a spoon-like head $b^2$, behind which is provided a seat $b^3$ for a float $b^4$, formed of a cylindrical body, which should be hollow, having an oblique upper face $b^5$, and which is guided by a bar $a$, passing through it and fastened at its lower end in the seat $b^3$ and at its upper end to a bar $a'$, extending backward from the lever $b$, the guide-bar $a$ having a stop $a^2$ for the float $b^4$. When either of the tubes N and N' becomes filled with water, the rise of the latter beyond the float-valve turns the lever $b$ on its fulcrum in the direction to force the head $b'$ against the mouth of duct $f^2$, thereby closing the latter, the large extent of surface afforded by the construction of the float-valve being presented to the water for its buoying action, the force of which to close the float-valve is increased by the rise of the float $b^4$. In forcing out the water from either tube by air-pressure introduced upon it from above, as hereinafter described, when the level of the water falls below the valve, so that air-pressure can strike it from above, the large area of surface presented to the action of the discharging water by the oblique face of the float $b^4$ and spoon end $b^2$ tends to keep the valve closed till the level of the water sinks below it, when the gravity of the valve turns the lever $b$ to open the valve and admit air-pressure into the duct $f^2$, whence it enters the pipe $e$ or $e'$, as the case may be, for operating the piston L', as hereinafter described.

By the means thus described the supply of water to a tank E for immersion of the reservoirs D and D' may be obtained from a well W by the operation of the apparatus as follows: Supposing the tube N' to be full of water and the tube N, previously filled, about emptied of its contents by means of air-pressure introduced downward upon the contained water to force it through the duct $h$ into the stand-pipe $N^2$, which discharges into the tank E, compressed air from the tube N, on the opening of the float-valves R therein, will have passed through the pipes $e$ $e^2$ into the cylinder K' and have driven the piston L' to the end of its stroke at which it is represented in Fig. 3, the air ahead of it being forced through the pipe $e^5$ into the tube N'. This movement of the piston, through its connection with the slide-valve I', will have caused the latter to cover and produce communication between the duct $s^2$ and port $x$, which leads through the pipe $c'$ to the pump B, permitting the suction action of the latter to withdraw the compressed air from the tube N and force it into the holder C, and in the said position of the valve I' the duct $s^3$ communicates through the valve-chamber with port $x'$, to which the pipe $c$ leads from the compressed-air holder C, thus admitting air-pressure upon the water in the tube N' to discharge it through the duct $h'$ into the pipe $N^2$. As the level of the water in tube N' falls below the float-valve R' therein, the latter opens to permit air-pressure from that tube to enter the cylinder K' by way of the pipes $e'$ $e^3$ and drive the piston L' to the opposite end of its stroke, (the air ahead of it escaping into tube N through the pipe $e^4$,) with the effect of setting the slide-valve I' to cover the port $x$ and duct $s^3$ in order to effect withdrawal of the air-pressure contents of the tube N' and of producing communication between the port $x'$ and duct $s^3$ to admit air-pressure into the tube N, which will meantime have filled with water through its base having the inwardly-opening check-valves $h^2$. The apparatus for raising the water supplied to the tank E meantime operates in the manner described.

Instead of compressed air, under some conditions it is desirable to use other form of gas under pressure, such as hydrocarbon gas, for our purpose, and we include the same in our invention.

What we claim as new, and desire to secure by Letters Patent, is—

1. In a liquid-raising apparatus, the combination of an engine, an air-pump, a compressed air-holder, a pair of reservoirs adapted to be replenished from a liquid supply, and an upward extending discharge-pipe with which each of said reservoirs communicates controllably, a slide-valve device comprising a chamber having ports communicating, respectively, with the suction-side of said pump and with said compressed air-holder and provided with ducts leading to said reservoirs, a slide-valve in said chamber movable to connect said ducts alternately with said exhaust-port and said compressed-air inlet-port, a piston operatively connected with the slide-valve and contained in a cylinder, air-inlet pipes leading from opposite ends of said cylinder into said reservoirs and provided with check-valves, air-outlet pipes leading into the opposite ends of the cylinder from said reservoirs and provided therein with valves, and float-valve mechanism in the reservoirs connected with the valves in said air-outlet pipes to open and close them, substantially as and for the purpose set forth.

2. In a liquid-raising apparatus, the combination with a reservoir having check-valves in its base-portions whereby it is adapted to be automatically replenished from a liquid supply, of a valve-closing head adjustably supported in the reservoir to be lowered for locking said valves and raised to release them, substantially as described.

3. In a liquid-raising apparatus the combination, with an air-pressure mechanism, of a pair of reservoirs in a liquid supply and adapted to be automatically replenished therefrom, an upward extending discharge-pipe with which each reservoir communicates controllably, a tube inserted into each reservoir, pipes $e$ and $e'$ leading into said tubes, float-valve mechanism in each said tube for opening and closing their communication with said pipes, a slide-valve device for controlling communication between the air-pressure supply and exhaust and said tubes, and a piston operatively connected with the slide-valve and contained in a cylinder communicating from opposite sides of the piston respectively with said reservoirs through the pipes $e$ and $e'$, whereby the slide-valve is automatically adapted to open one tube to the air-pressure exhaust and close the other to said exhaust and open it to the air-pressure supply, substantially as and for the purpose set forth.

4. In a liquid-raising apparatus, the combination with air-pressure mechanism, of a pair of tubular reservoirs in a liquid supply, and adapted to be automatically replenished therefrom, a tube inserted into each reservoir and carrying a nipple containing a duct $f^2$ and having connected with it a pipe, a float-valve in each said tube comprising a lever $b$ fulcrumed therein and adapted at one end to close said duct and having a spoon-shaped lower termination $b^2$, a seat $b^3$ and a guide-bar carrying a float $b^4$ and extending between said seat and an arm $a'$ on the lever, an upward extending discharge-pipe with which said tubes communicate controllably, a slide-valve device for controlling communication between the air-pressure supply and exhaust and said tubes, and a piston operatively connected with the slide-valve and contained in a cylinder communicating from opposite sides of the piston respectively with said tubes at the pipes in said nipples, whereby the slide-valve is automatically actuated to open one tube to the air-pressure exhaust and close the other to said exhaust and open it to the air-pressure supply, substantially as and for the purpose set forth.

5. A liquid-raising apparatus comprising, in combination, an engine A, a pump B and a compressed-air holder C, a pair of reservoirs D and D' in a liquid-supply and adapted to be automatically replenished therefrom, an upward extending discharge-pipe with which said reservoirs communicate controllably, a slide-valve device H comprising a chamber having ports communicating respectively with the suction side of said pump and with the compressed-air holder and provided with ducts leading to said reservoirs and a slide-valve in said chamber adjustable to connect said ducts alternately with said exhaust-port and said compressed-air inlet-port, a piston operatively connected with the slide-valve and contained in a cylinder having air-discharge communication from its opposite ends respectively with said reservoirs and air-inlet communication therewith from its opposite ends, float-valve mechanism in the reservoirs for controlling said air-inlet communication with said cylinder, a pair of tubular reservoirs in a liquid supply and adapted to be automatically replenished therefrom, a tube inserted into each reservoir and carrying a nipple containing a duct $f^2$ and having connected with it a pipe, a float-valve in each said tube for opening and closing said duct $f^2$ therein, a slide-valve device H' comprising a chamber having ports communicating respectively with the suction side of said pump and with the compressed-air holder and provided with ducts leading to said tubes and a slide-valve in said chamber adjustable to connect said ducts alternately with said exhaust-port and said compressed-air inlet-port, a piston operatively connected with said slide-valve and contained in a cylinder having air-discharge communication from its opposite ends respectively with said tubes and air-inlet communication therewith at its opposite ends from the pipes in said nipples, and an upward extending discharge-pipe with which said tubes communicate controllably the whole being constructed and arranged to operate substantially as described.

ISAAC T. DYER.
RICARD O'SULLIVAN BURKE.

In presence of—
M. J. FROST,
W. U. WILLIAMS.